Oct. 20, 1959     F. L. WAGNER     2,908,962

WELD-CLEARING TOOLS

Filed Feb. 24, 1959

Forrest L. Wagner INVENTOR.

BY Bush & Bush
Attorneys.

United States Patent Office 2,908,962
Patented Oct. 20, 1959

2,908,962
WELD-CLEARING TOOLS
Forrest L. Wagner, Tipton, Iowa
Application February 24, 1959, Serial No. 795,085
2 Claims. (Cl. 29—81)

My invention relates to a tool usable to aid in welding metals by clearing the welds from slag, grit or fragments of extraneous matter.

It is well known that in making welds to unite pieces of iron, steel, aluminum and some other metals, it is common to find pieces of welding rod coatings, slag, grit, and other foreign matter, intermingled with the weld or welding material used in some stages of welding, which will tend to weaken and impair the weld unless removed before completing the weld.

The objects of my invention are to provide an improved metal tool which is usable not only to loosen up such slag, grit or other foreign matter, but will simultaneously provide a blast of air to carry away from the weld and the eyes of the operator, the loosened particles as soon as they are loosened and to leave the weld and the edges to be joined by the completion of the weld clean and free from any foreign matter which might impair the strength or tightness of the weld;

To provide a lightweight simple tool of convenient size having a tubular handle united to a head, to be applied by one hand of the user, and which can be used either to chip the slag, grit, etc. from a partially made weld by percussion, or to enter and clear out any pits or cavities occurring therein, and to simultaneously blow such particles away laterally and guard the eyes of the user;

To provide such a tool with a tubular rubber or elastic grip to accommodate the hand of the user;

To provide a conduit in the handle of such a tool by which compressed air may be conducted from the grip end of the handle either to a chipping blade or to a pick point or prod united to the head thereof with a valve mounted on the handle in position to close it and with simple means for the operator to open the valve manually and with means to automatically close it when released and hold it in closed position either by a spring and/or by air pressure applied to the movable part of the valve;

To provide means for an operative connection of a compressed air hose to the grip end of the tool handle.

Figure 1:
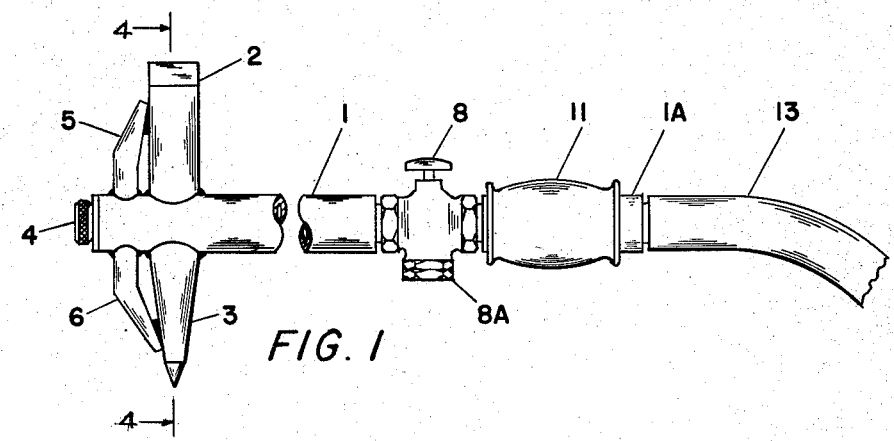
Figure 2:
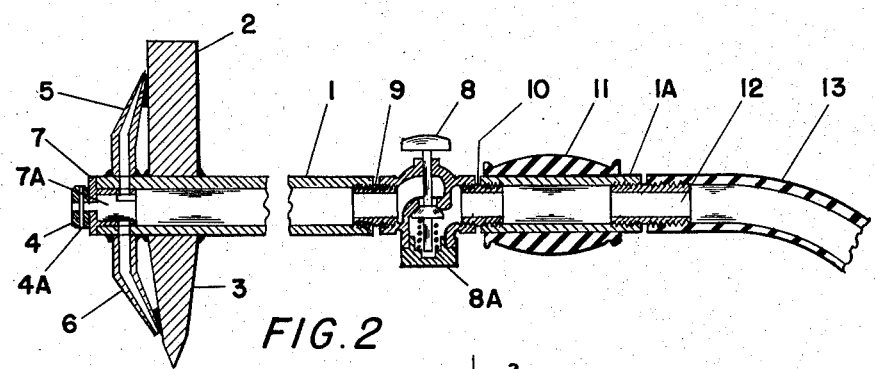
Figure 5:
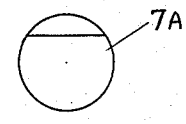
Figures 3, 4:
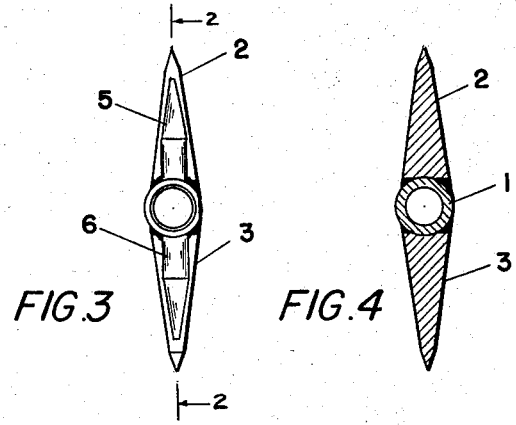

I accomplish these objects by the means shown in the accompanying drawings, in which:

Figure 1 is a side elevation;
Figure 2 is a sectional elevation on the line 2—2 of Figure 3;
Figure 3 is an end elevation of the head;
Figure 4 is a sectional view on the line 4—4 of Figure 1;
Figure 5 is an enlarged detail end view of the valve 7A.

This tool includes a sectional tubular handle 1 with intermediate tubular sections 1 and 10, having an air valve 8A mounted therein and, at the head end of the handle, a blade 2 and a pick point 3 extending at right angles to the tube and united thereto by welding or other suitable means, with an extended end of the handle 1 closed by an end plate or plug secured by a pressfit.

At the opposite end of the handle 1 an extension 1A of the tube 1 is secured with its inner end threaded and fitted to intermediate short sections 9 and 10 in which an air valve 8A is mounted. One end of the intermediate section 9 is united to the adjacent end of the tube 1 by threading or press-fit or other suitable means.

The outer end of the extension 1A has internal threads in which a coupling 12 is fitted.

A flexible hose carrying compressed air has a terminal united to the coupling 12 from which compressed air at a suitable pressure is led to the intermediate valve section and thence into the handle 1 and to outlets 5 and 6 on the blade 2 and prod 3.

The extension 1A is covered by a tubular grip 11 of rubber or similar material mounted thereon which may be grasped by one hand of the operator with a thumb or finger in contact with a button or disk 8 carried by a rod which extends into the valve 8A and, when the button is pressed, actuates the valve body so as to open the valve seat and allow air to pass from extension 1A into the tube 1 and thence to the conduits 5 and 6. The valve will close automatically by spring and air pressure when the button 8 is released.

The conduits 5 and 6 are small tubular pipes with their inner ends secured around suitable openings in the pipe 1 and preferably welded to it. Their outer ends form outlets and are secured to the adjacent blade or prod by welding or other suitable means. They extend outwardly close to the outer ends of the blade or prod, preferably within one-half an inch, more or less, thereof to direct a current of air to the area of contact of the blade edge or the pick point with the weld being made. Air compressed to a pressure in common use for tires will be sufficient in most cases but a pressure of from 25 to 75 lbs. will be very effective. The size of the outlets should be varied when required.

In the operation of this tool it is held in one hand by the operator and used primarily to chip a partial weld to break up the slag, grit or other foreign matter therein and to simultaneously blow it away laterally from the weld.

It is also usable to thrust the pick point or prod into any of the pits or recesses that sometimes occur in incomplete welds and to draw out extraneous matter or fragments therefrom simultaneously when applying the blast of compressed air to the area of contact.

A plug 7 is mounted in the end of the tube 1 by a press-fit in which a rotary valve 7A is seated to open or close the conduits 5 and 6 or either of them, and to prevent any flow of air through one of them if desired while the other is open and in use. It is provided with a knurled cap 4 secured to a small rod integral with the valve 7A by a pin 4A by which the valve is readily adjustable by hand to open or close either or both angular conduits.

Various changes may be made in the size, shape, and materials of different parts of my appliance without departing from the spirit of my invention as shown in the claims and I do not limit my claims to the precise forms shown in the drawings.

I claim:

1. In a weld clearing tool as described, the combination with a tubular handle, of a head at one end thereof having a chipping blade and a prod united thereto and extending at opposite sides of the handle at right angles thereto, tubular conduits united to the handle near the head with their outer ends secured to the chapping blade and prod respectively near the outer ends thereof, ports in the handle leading to the passages in the conduits, a plug secured by press-fit in the end of the handle beyond the head, and a manually operable rotatable valve carried by said plug arranged to close either one or both of the ports from the handle to the conduits.

2. The combination as described in claim 1, and a tubular resilient grip mounted upon the handle at the free end thereof.

References Cited in the file of this patent

UNITED STATES PATENTS

| 640,878 | Curley | Jan. 9, 1900 |
| 882,259 | Meyer | Mar. 17, 1908 |
| 885,985 | Dunlap | Apr. 28, 1908 |
| 1,343,490 | Albertson | June 15, 1920 |
| 1,446,854 | Marshall | Feb. 27, 1923 |
| 1,643,606 | Itjen | Sept. 27, 1927 |
| 1,694,733 | Cummins | Dec. 11, 1928 |
| 1,747,258 | O'Neil | Feb. 18, 1930 |
| 1,945,810 | Holtz | Feb. 6, 1934 |
| 2,361,660 | Sneddon | Oct. 31, 1944 |
| 2,394,760 | Felton | Feb. 12, 1946 |
| 2,443,602 | Clark | June 22, 1948 |
| 2,610,350 | Smith | Sept. 16, 1952 |
| 2,782,451 | Sneddon | Feb. 26, 1957 |
| 2,801,431 | Eastis | Aug. 6, 1957 |